Oct. 16, 1923.

C. LORENSON

MOWER

Original Filed Nov. 26, 1918    3 Sheets-Sheet 1

1,470,989

WITNESSES
Frederick Diehl.
Walton Harrison.

INVENTOR
Carl Lorenson
BY
ATTORNEYS

Oct. 16, 1923.
C. LORENSON
MOWER
Original Filed Nov. 26, 1918     3 Sheets-Sheet 2
1,470,989
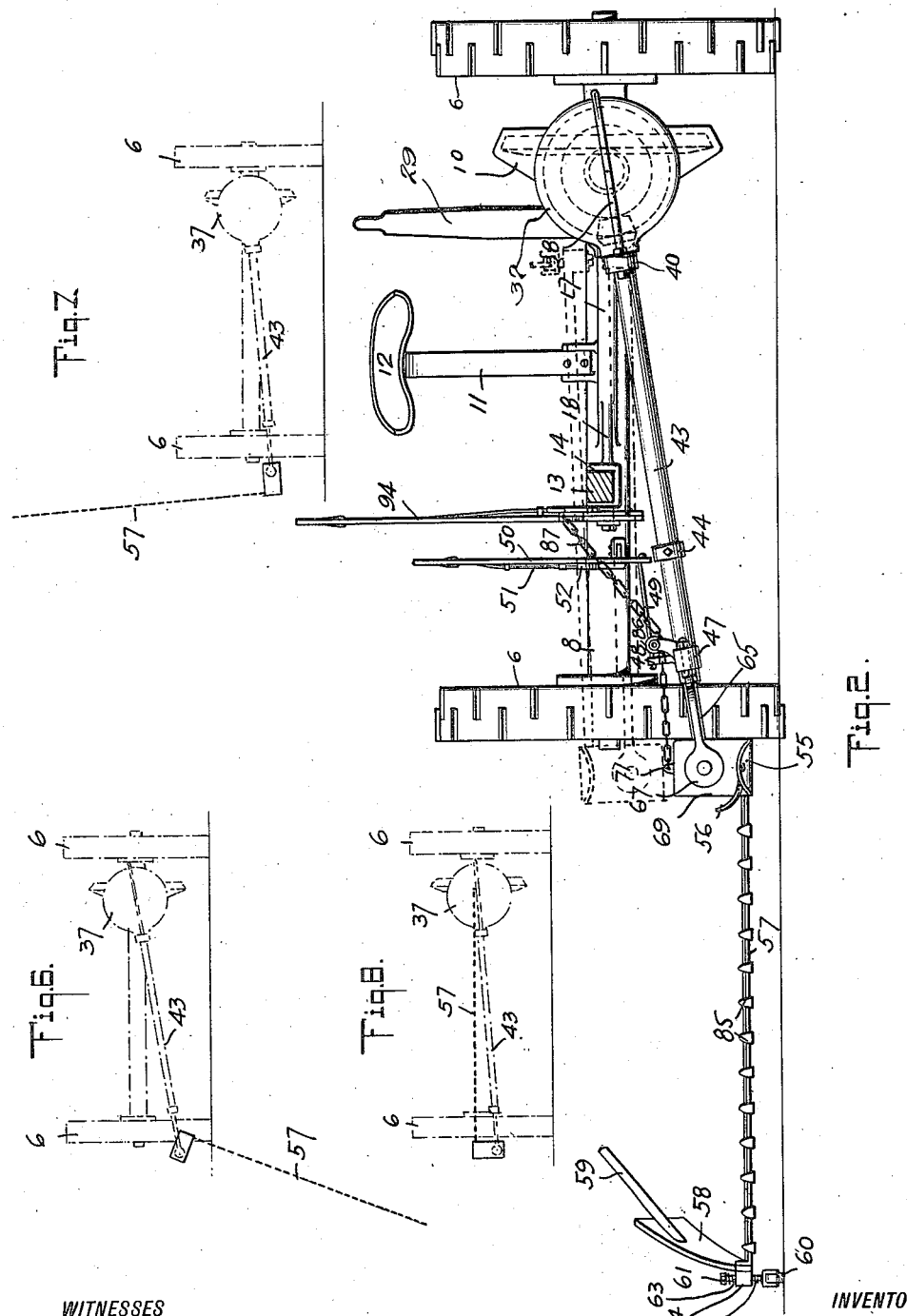
WITNESSES
Frederick Diehl
Walton Harrison
INVENTOR
Carl Lorenson
BY Munn & Co
ATTORNEYS Oct. 16, 1923.
C. LORENSON
MOWER
Original Filed Nov. 26, 1918    3 Sheets-Sheet 3
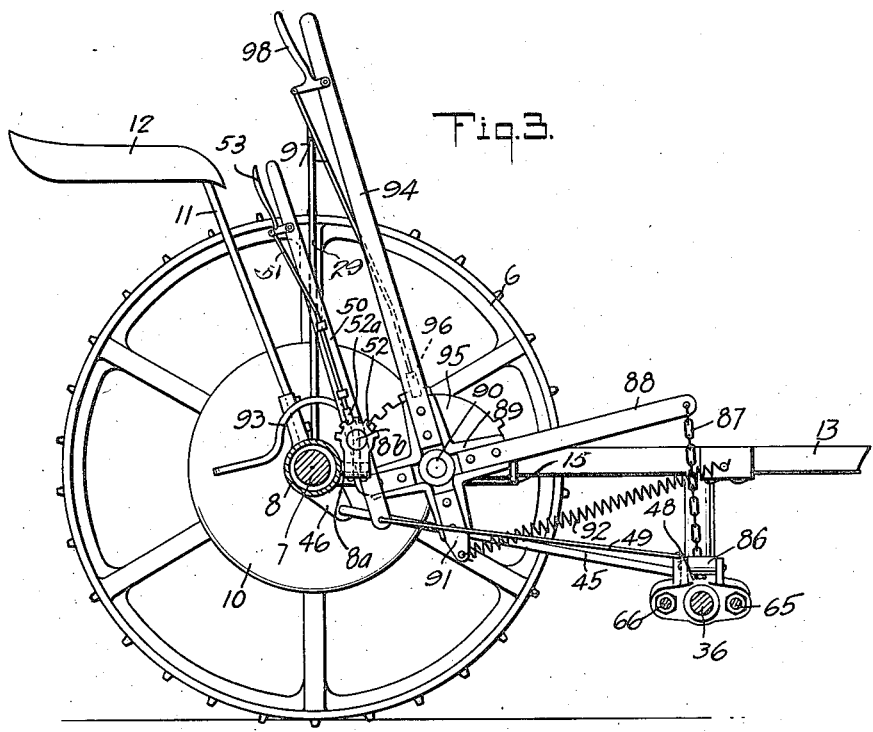
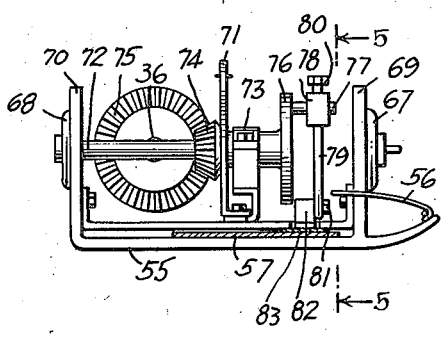
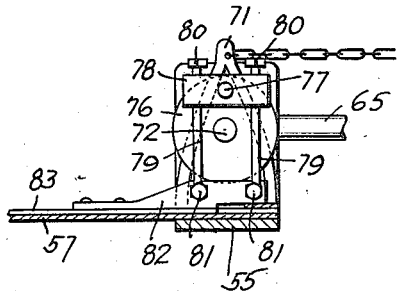
WITNESSES
INVENTOR
Carl Lorenson
BY
ATTORNEYS Patented Oct. 16, 1923.

1,470,989

UNITED STATES PATENT OFFICE.

CARL LORENSON, OF DAVENPORT, IOWA, ASSIGNOR TO LORENSON HARVESTER COMPANY, OF LE CLAIRE, IOWA.

MOWER.

Application filed November 26, 1918, Serial No. 264,193. Renewed March 2, 1923.

*To all whom it may concern:*

Be it known that I, CARL LORENSON, a citizen of the United States, residing at Davenport, in the county of Scott and State of Iowa, have invented a new and Improved Mower, of which the following is a full, clear and exact description.

My invention relates to mowers, my more particular idea being to increase the mobility of the machine and to enable it to be used where the cutter bar is required to work at various angles relative to the general position of the machine so as to enable the machine to effectively cut grass or vegetation where the slope of the ground, passed over by the cutter bar, is generally unfavorable for cutting.

My invention further contemplates means for enabling the cutter bar to be shifted into such position as to be practically inverted, and used for topping weeds or the like in front at the left side of the machine.

My invention further contemplates various improvements in the construction of the mower, for the purpose of increasing the efficiency thereof.

Reference is to be had to the accompanying drawings forming a part of this specification and in which like characters indicate like parts in all the views.

Figure 2 is a section on the line 2—2 of Fig. 1 looking in the direction indicated by the arrows.

Figure 3 is a section on the line 3—3 of Fig. 1 looking in the direction indicated by the arrows.

Figure 4 is a section on line 4—4 of Fig. 1 looking in the direction indicated by the arrows.

Figure 5 is a section on the line 5—5 of Fig. 4 looking in the direction indicated by the arrows.

Figure 6 is a diagram showing my machine as used for cutting grass upon a surface sloping obliquely downward from the path of travel of the machine.

Figure 7 is a diagram showing my machine as used for cutting grass upon a surface sloping upward from the path of travel of the machine.

Figure 8 is a diagram showing the device as used with the sickle and parts immediately associated therewith inverted for the purpose of cutting the tops of weeds disposed in front at the left side of the machine as it travels forward.

Figure 1:
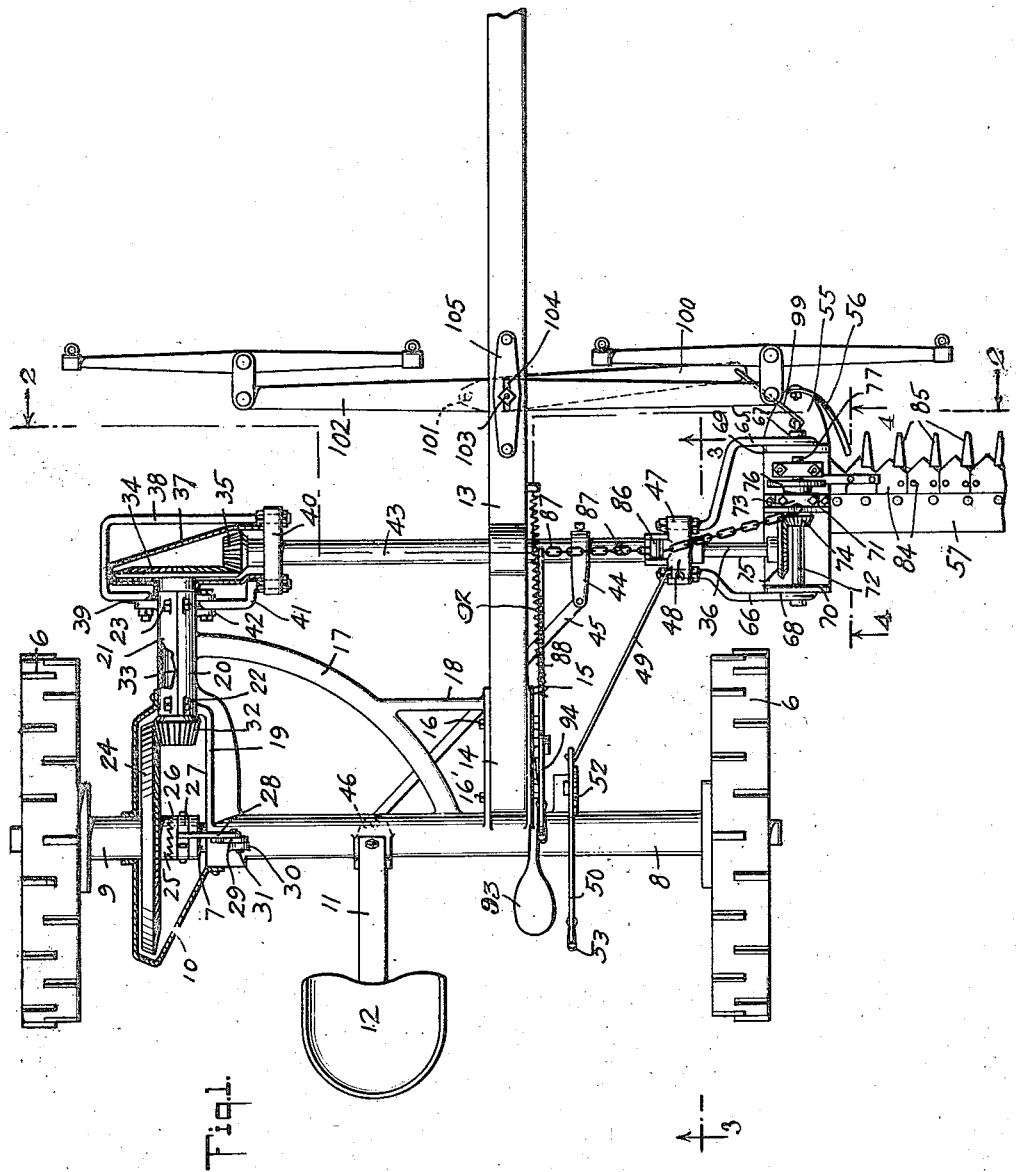
Figure 1 is a fragmentary plan of my improved mower.

A pair of supporting wheels are shown at 6 and a main shaft appears at 7, this shaft extending through a pair of tubular casings, 8, 9. Between these tubular casings and secured rigidly thereto is a gear casing 10. A seat post is shown at 11 and carries a seat 12. The tongue of the machine appears at 13, and at 14, 15 are side plates secured to this tongue by means of bolts 16 and 16'. A brace appears at 17 and is provided with an arm 18, the latter being secured to the side plate 14. Another brace is shown at 19 and is integral with the tubular casing 8. The brace 19 is connected with a semi-tube 20. This semi-tube is connected with another semi-tube 21 by bolts 22 so as to form a bearing of substantially tubular form.

Mounted rigidly upon the main shaft 7 and located within the gear casing 10 is a bevel gear 24 and also a clutch member 25. Another clutch member 26 is secured rigidly to the main shaft 7 and revoluble therewith. The clutch member 26 is slidable relative to the main shaft 7 and is provided with a clutch collar 27 whereby it is thrown into and out of engagement with the clutch member 25. Connected with the clutch collar 27 is a link 28, this link being also connected to a hand lever 29 whereby the clutch is thrown into and out of action at the will of the operator, who sits upon the seat 12.

A lug 30 extending upwardly from the tubular casing 8 carries a pin 31, and the hand lever 29 is supported by this pin. Meshing with the bevel gear 24 is a bevel pinion 32. This pinion is mounted upon a shaft 33 which extends through the tubular bearing made up of the semi-tubes 20 and 21. The shaft 33 carries a bevel gear 34 which meshes with a bevel pinion 35. The bevel pinion 35 is mounted rigidly on the shaft 36, and with the bevel gear 34 is enclosed in a gear casing 37. A brace 38 extends partially around this casing and is secured to a lug 39 carried by the semi-tube 21. The brace 38 is also connected to a head 40. From this head a brace 41 extends to a lug 42 carried by the semi-tube 20. Extending laterally from the head 40 is a tubular casing 43, through which the shaft 36 extends.

Mounted rigidly upon the tubular casing 43 is a collar 44, and connected with this collar is a brace rod 45 which extends obliquely backward and is secured rigidly to a lug 46, the latter projecting downwardly and forwardly from the tubular casing 8, as may be understood from Figs. 1 and 3. Mounted loosely upon the tubular casing 43 and free to rock relatively thereto is a rocking head 47. Mounted upon this rocking head and extending obliquely upward therefrom is a lug 48 of the form shown more particularly in Fig. 3. A rocking link 49 is connected to the upper end of the lug 48 and also to the lower end of a hand lever 50. This hand lever carries a pawl rod 51, and upon the lower end of this pawl rod is a pawl 52$^a$ which detachably engages a sector 52. This sector is carried upon a boss 8$^a$ which extends forwardly from the tubular casing 8, as may be understood from Fig. 3. The hand lever 50 is journalled upon a pin 8$^b$ extending laterally from the sector 52, as shown more particularly in Fig. 3.

The shoe of the mower appears at 55, and is shown more in detail in Figs. 4 and 5. The grass rod appears at 56 and is connected with the front end of the shoe. The sickle bar appears at 57 and at its outer end carries a separator board 58, 59. Connected with the outer end of the sickle bar is a turf wheel 60. It is mounted upon a guide bolt 61 which carries two springs 62, 63, these springs being disposed upon opposite sides of a bearing 64 through which the guide bolt works vertically in the usual manner.

The shoe 55 is located between the outer ends of two arms 65, 66, the latter being provided with eyes 67, 68. The shoe is provided with a front wall 69 and with a rear wall 70, as may be understood from Fig. 4. The shoe is further provided with an actuating arm 71 having substantially a triangular form, as may be understood from Figs. 4 and 5. A revoluble shaft 72 is carried by the shoe and extends through the rear wall 70 and through a bearing 73. This shaft carries a bevel pinion 74 mounted rigidly upon it. This bevel pinion meshes with a bevel gear 75 mounted upon the shaft 36 which, as above stated, extends through the tubular casing 43. The shaft 72 carries a disk 76, and extending laterally from this disk is a pin 77. This pin extends through a head 78, this head being mounted to slide vertically on two standards 79. Mounted upon the upper ends of these standards are two nuts 80 which serve as limit stops for preventing excessive travel of the head 78. The standards 79 are, by means of bolts 81 or other appropriate fastenings, secured to a lug 82. This lug is mounted upon a cutter bar 83.

The parts are so arranged that the rotation of the disk 76 causes the head 78 to move up and down upon the standards 79, and also to move back and forth so as to cause a reciprocating motion in the cutter bar 83. The cutter bar is provided with teeth 84, as may be seen in Fig. 1. The guard fingers appear at 85, and like the teeth of the cutter bar may be of the usual or any desired form.

Revolubly mounted upon the head 47 is a roller 86, and extending beneath this roller is a chain 87 connected with the actuating arm 71 carried by the shoe 55. The chain is also connected to a supporting arm 88 of the form shown more particularly in Fig. 3. This supporting arm is carried by a rocking star wheel 89, the latter being mounted upon a journal neck 90 which extends laterally from the framework. The rocking star wheel 89 also carries an arm 91, the latter being connected with a spring 92 which is also connected to the tongue 13 and is used as a retractile spring for the star wheel and parts carried thereby. The star wheel also carries a foot lever 93 and a hand lever 94. The foot lever is used for rocking the star wheel in instances where comparatively little effort is required for this purpose, but when greater effort is necessary, the hand lever 94, as well as the foot lever 93, is brought into use.

Mounted rigidly upon the framework is a sector 95 disposed adjacent the hand lever 94. This hand lever carries a pawl 96 for engaging the sector, thus locking the hand lever 94 in different positions. The pawl 96 is controlled by a pawl rod 97, the latter being, in turn, controlled by a handle 98 carried upon the upper end of the hand lever 94.

The purpose of the star wheel 89 carrying the hand lever 94 and the foot lever 93 is to raise and lower the supporting arm 88 and thus operate the chain 87 and parts actuated thereby. When the supporting arm 88 is raised there is a pull upon the chain 87, and as this chain is connected with the actuating arm 71 of the shoe 55, this shoe is caused to rock upon the axis of the shaft 72 as a center. When the supporting arm 88 is lowered, the shoe 55 is rocked, but in the opposite direction. The result is that when the actuating arm 88 is raised the outer end of the sickle bar is raised, and, vice versa, when the actuating arm 88 is lowered the outer end of the sickle bar is lowered correspondingly. Thus, the outer end of the sickle bar can be raised or lowered within wide angular limits.

If desired, the outer end of the sickle bar can be raised into a vertical position, and even passed over the top of the machine so that the sickle bar and parts associated with it are inverted and are some distance above the ground, as shown more particularly in Fig. 8.

Again, the sickle bar may be restored to its normal position, or even dropped below the same, as will be understood from Fig. 6. Some times the mower is used for cutting grass or weeds upon a surface sloping obliquely upward from the ground surface upon which the wheels of the machine are running. This may occur where the cutting is upon the edge of a mound or embankment. For this purpose the sickle bar is brought into the position indicated in Fig. 7. The device for preventing side draft appears in Fig. 1. Connected with the shoe 55 is a link 99 which leads to an arm 100, the latter being connected by a pivot pin 101 with a double tree 102, this double tree working upon a pin 103 which extends through a slot 104 in a wearing plate 105 and in the tongue 13 of the machine.

The operation of my device is as follows:

The parts being assembled and arranged as above described and as shown in the drawings, the operator occupies the seat 12 and the machine is driven forwardly by horses or other draught animals. The operator by manipulating the hand lever 50 can tilt the sickle bar so that its front edge is raised or lowered relative to its rear edge, and in this manner can cause the sickle and parts accompanying the same to glide over obstacles and also to conform to great irregularities in the character of the ground surface. Ordinary irregularities are taken care of automatically by the sickle bar, which is free to tilt in the manner just indicated by the automatic working of the head 47 from the tubular bearing 43.

Suppose, now, that the operator wishes to lower the outer free end of the sickle bar in order to make the cut upon a slope disposed adjacent to the path of travel of the machine. The operator simply uses the hand lever 94 or the foot lever 93, or both as the case may be, and causes the sickle bar to assume a suitable position for the purpose contemplated.

In extreme cases the sickle bar can be placed in the position indicated in Figs. 7 and 8. When used as indicated in Fig. 8 the machine can be passed over stalks of corn eighteen inches high without injury thereto, the cut being in front at the left side of the machine. This is desirable in instances where the machine is used for topping weeds disposed along the edge of a cornfield.

I do not limit myself to the precise mechanism shown, as variations may be made therein without departing from the spirit of my invention.

I claim:

1. In a mower, a frame, a pair of ground wheels arranged in transverse alignment supporting said frame, and a cutter bar hingedly secured adjacent to one end to the frame, and arranged to extend in front of and between said ground wheels or laterally of the frame at one side of the ground wheels.

2. An apparatus for trimming hedges and mowing lawns, comprising a cutter mechanism, means for supporting the said mechanism for pivotal motion through an angle of 180 degrees about an axis at right angle to the cutting edge and means for operating the cutter mechanism in any angular position.

3. In a mower, the combination of a travelling frame, a pivotally mounted shoe carried thereby, gearing mounted upon said shoe, mechanism operable by the forward movement of the frame for actuating said gearing, a disk connected with said gearing and actuated thereby, a pin extending from said disk, a head mounted upon said pin, standards upon which the head is slidably mounted, and a cutting mechanism connected with said standards.

4. In a mowing machine, a shaft, means for operating the shaft, a tubular member in which the shaft is mounted, arms carried by the tubular member, a shoe provided with a vertical arm, a cutting mechanism carried by the shoe, means for operating the cutting mechanism from the said shaft, means for mounting the shoe between the arms whereby it may be turned into various angles or swung into inverted position, and means connected with the arm of the shoe for operating it.

5. In a mowing machine, a shaft, means for operating the shaft, a tubular member in which the shaft is mounted with one end projecting beyond the same, bent arms carried by the tubular member and extending on opposite sides of the shaft at unequal distances therefrom, a shoe pivoted between the said arms and provided with a vertical arm, a shaft mounted in the shoe and geared with the first shaft, a cutting mechanism carried by the shoe, means for operating the cutting mechanism from the shaft of the shoe, an operating lever, and a flexible member connected with the lever and with the arm of the shoe, whereby provision is made for turning the shoe and cutting mechanism at various angles or swinging them into an inverted position.

6. A device of the character described comprising ground wheels, a tubular casing disposed intermediate thereof, a shaft extending through said tubular casing, a bevel gear mounted upon said shaft, a clutch mechanism for throwing said bevel gear into and out of action, a bevel pinion meshing with said bevel gear, a revoluble shaft upon which said bevel pinion is mounted, a tubular casing through which said shaft extends, a bevel gear mounted upon the opposite end of said shaft, a bevel pinion meshing with said last-mentioned bevel gear, a gear casing containing said last mentioned bevel gear and said gear pinion, a shaft connected with said last-mentioned bevel pinion, and cutting mechanism connected with said last-mentioned shaft and driven thereby.

7. In a mowing machine, a tubular member, a member mounted to rock on the tubular member and provided with arms, a shoe pivotally mounted in the arms, a driven shaft mounted in the tubular member and projecting beyond the same into the shoe, a shaft mounted in the shoe, gearing connecting the shafts, a disk mounted on the shaft and provided with a lateral pin, a cutter bar, standards carried by the cutter bar, and a head mounted to slide on the standards and with which the pin of the disk engages.

8. In a mowing machine, a tubular member, a rocking member mounted on the tubular member and provided with arms, a shoe pivotally mounted in the arms, a driven shaft mounted in the tubular end projecting beyond the same into the shoe and having a gear wheel at its end, a shaft mounted in the shoe, and having a pinion meshing with the gear wheel of the driven shaft, a disk on the shaft and provided with a lateral pin, a cutter bar, vertical standards carried by the cutter bar, a head mounted to slide on the standards and with which the pin of the disk engages, a hand lever, and a link connecting the lever with the said rocking member.

9. In a mowing machine, a rocking member provided with arms, a shoe mounted in the arms, and provided with a vertical arm, a shaft mounted in the shoe, a disk on the shaft and provided with a pin, a cutter bar, standards carried by the cutter bar, a head mounted to slide on the standards and with which the pin of the disk engages, means for operating the shaft, an armed operating lever, a spring having one end secured to an arm of the lever and its other end to a fixed part of the machine, and a flexible connection between another arm of the lever and the arm of the shoe.

10. In a mowing machine, an axle, tubular casings through which the axle passes, a gear casing connecting the tubular casings, a gear wheel on the axle in the gear casing, a tubular casing projecting forwardly from the gear casing, a shaft in the tubular casing and having at one end in the gear casing a pinion meshing with the gear wheel, a gear casing at the forward end of the tubular casing and into which the said shaft extends, a gear wheel on said shaft in said gearing casing, a transverse shaft extending into the last named gear casing and provided with a pinion meshing with the gear wheel of the said shaft, a cutting mechanism, and means for operating the cutting mechanism from the transverse shaft.

CARL LORENSON.